(12) United States Patent
Sedukhin et al.

(10) Patent No.: US 8,239,505 B2
(45) Date of Patent: Aug. 7, 2012

(54) PROGRESSIVELY IMPLEMENTING DECLARATIVE MODELS IN DISTRIBUTED SYSTEMS

(75) Inventors: Igor Sedukhin, Issaquah, WA (US); Daniel Eshner, Issaquah, WA (US); Amol S. Kulkarni, Bothell, WA (US); Girish M. Venkataramanappa, Redmond, WA (US); Leo S. Vannelli, III, North Bend, WA (US); Sumit Mohanty, Redmond, WA (US); Sundeep Sahi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 961 days.

(21) Appl. No.: 11/771,816

(22) Filed: Jun. 29, 2007

(65) Prior Publication Data
US 2009/0006062 A1    Jan. 1, 2009

(51) Int. Cl.
*G06F 15/177* (2006.01)
*G06F 15/173* (2006.01)

(52) U.S. Cl. ......... 709/221; 709/220; 709/223; 709/224

(58) Field of Classification Search .................. 709/220, 709/221, 223, 224; 707/100; 717/174
See application file for complete search history.

(56) References Cited

U.S. PATENT DOCUMENTS

| | | |
|---|---|---|
| 4,751,635 A | 6/1988 | Kret |
| 5,423,003 A | 6/1995 | Berteau |
| 5,602,991 A | 2/1997 | Berteau |
| 5,655,081 A | 8/1997 | Bonnell |
| 5,764,241 A | 6/1998 | Elliott |
| 5,809,266 A | 9/1998 | Touma |
| 5,893,083 A | 4/1999 | Eshghi |
| 5,913,062 A | 6/1999 | Vrvilo et al. |
| 5,937,388 A | 8/1999 | Davis et al. |
| 5,958,010 A | 9/1999 | Agarwal |
| 6,005,849 A | 12/1999 | Roach et al. |
| 6,026,404 A | 2/2000 | Adunuthula |
| 6,055,363 A | 4/2000 | Beals et al. |
| 6,070,190 A | 5/2000 | Reps |
| 6,167,538 A | 12/2000 | Neufeld et al. |
| 6,185,601 B1 | 2/2001 | Wolff |

(Continued)

FOREIGN PATENT DOCUMENTS
EP         0733967         9/1996
(Continued)

OTHER PUBLICATIONS
U.S. Appl. No. 11/844,177, filed Aug. 23, 2007, Sedhukin.
(Continued)

*Primary Examiner* — Aaron Strange
(74) *Attorney, Agent, or Firm* — Workman Nydegger (57) ABSTRACT

A system for automatically implementing high-level instructions in a distributed application program, where the high-level instructions reflect the behavior of the distributed application program, includes at least a tools component. The tools component is used to write high-level instructions in the form of declarative models, and place them in a repository. An executive component then receives the declarative models from the repository and refines them (e.g., via progressive elaboration) until there are no ambiguities. A platform-specific driver then translates the commands from the executive component, effectively turning the declarative model instructions into a set of imperative actions to be implemented in one or more application containers. The platform-specific driver also relays one or more event streams to an analytics means, which can result in modifications to the declarative models and corresponding new sets of instructions coming through the platform-specific driver at a later point.

19 Claims, 3 Drawing Sheets

U.S. PATENT DOCUMENTS

| | | |
|---|---|---|
| 6,225,995 B1 | 5/2001 | Jacobs |
| 6,230,309 B1 | 5/2001 | Turner |
| 6,247,056 B1 | 6/2001 | Chou |
| 6,263,339 B1 | 7/2001 | Hirsch |
| 6,279,009 B1 | 8/2001 | Smirnov et al. |
| 6,327,622 B1 | 12/2001 | Jindal |
| 6,330,717 B1 | 12/2001 | Raverdy et al. |
| 6,334,114 B1 | 12/2001 | Jacobs |
| 6,336,217 B1 | 1/2002 | D'Anjou et al. |
| 6,342,907 B1 | 1/2002 | Petty |
| 6,415,297 B1 | 7/2002 | Leymann et al. |
| 6,477,665 B1 | 11/2002 | Bowman-Amuah |
| 6,618,719 B1 | 9/2003 | Andrei |
| 6,640,241 B1 | 10/2003 | Ozzie |
| 6,654,783 B1 | 11/2003 | Hubbard |
| 6,662,205 B1 | 12/2003 | Bereiter |
| 6,697,877 B1 | 2/2004 | Martin |
| 6,710,786 B1 | 3/2004 | Jacobs |
| 6,715,145 B1 | 3/2004 | Bowman-Amuah |
| 6,718,535 B1 | 4/2004 | Underwood |
| 6,801,818 B2 | 10/2004 | Kopcha |
| 6,847,970 B2 | 1/2005 | Keller et al. |
| 6,886,024 B1 | 4/2005 | Fujita |
| 6,907,395 B1 | 6/2005 | Hunt |
| 6,931,644 B2 | 8/2005 | Riosa |
| 6,934,702 B2 | 8/2005 | Faybishenko |
| 6,941,341 B2 | 9/2005 | Logston et al. |
| 7,051,098 B2 | 5/2006 | Masters |
| 7,055,143 B2 | 5/2006 | Ringseth et al. |
| 7,065,579 B2 | 6/2006 | Traversat |
| 7,072,807 B2 | 7/2006 | Brown et al. |
| 7,072,934 B2 | 7/2006 | Helgeson |
| 7,079,010 B2 | 7/2006 | Champlin |
| 7,085,837 B2 | 8/2006 | Kimbrel et al. |
| 7,096,258 B2 | 8/2006 | Hunt |
| 7,103,874 B2 | 9/2006 | McCollum |
| 7,130,881 B2 | 10/2006 | Volkov et al. |
| 7,150,015 B2 | 12/2006 | Pace et al. |
| 7,155,380 B2 | 12/2006 | Hunt et al. |
| 7,155,466 B2 | 12/2006 | Rodriguez |
| 7,162,509 B2 | 1/2007 | Brown et al. |
| 7,168,077 B2 | 1/2007 | Kim |
| 7,174,359 B1 | 2/2007 | Hamilton, II et al. |
| 7,178,129 B2 | 2/2007 | Katz |
| 7,200,530 B2 | 4/2007 | Brown |
| 7,210,143 B2 | 4/2007 | Or et al. |
| 7,219,351 B2 | 5/2007 | Bussler et al. |
| 7,263,689 B1 | 8/2007 | Edwards et al. |
| 7,296,268 B2 | 11/2007 | Darling |
| 7,379,999 B1 | 5/2008 | Zhou et al. |
| 7,383,277 B2 | 6/2008 | Gebhard et al. |
| 7,395,526 B2 | 7/2008 | Arcand |
| 7,403,956 B2 | 7/2008 | Vaschilo et al. |
| 7,444,618 B2 | 10/2008 | Kulkarni et al. |
| 7,487,080 B1 | 2/2009 | Tocci |
| 7,512,707 B1 | 3/2009 | Manapragada |
| 7,526,734 B2 | 4/2009 | Vasilev |
| 7,703,075 B2 | 4/2010 | Das |
| 7,747,985 B2 | 6/2010 | Campbell et al. |
| 7,761,844 B2 | 7/2010 | Bove |
| 7,774,744 B2 | 8/2010 | Moore et al. |
| 7,796,520 B2 | 9/2010 | Poustchi |
| 7,797,289 B2 | 9/2010 | Chan et al. |
| 7,844,942 B2 | 11/2010 | Eilam |
| 7,890,543 B2 | 2/2011 | Hunt et al. |
| 8,122,106 B2 | 2/2012 | Hunt et al. |
| 2002/0035593 A1 | 3/2002 | Salim et al. |
| 2002/0038217 A1 | 3/2002 | Young |
| 2002/0099818 A1 | 7/2002 | Russell |
| 2002/0111841 A1 | 8/2002 | Leymann et al. |
| 2002/0120917 A1 | 8/2002 | Abrari et al. |
| 2002/0133504 A1 | 9/2002 | Vlahos et al. |
| 2002/0135611 A1 | 9/2002 | Deosaran et al. |
| 2002/0147515 A1 | 10/2002 | Fava et al. |
| 2002/0198734 A1 | 12/2002 | Greene |
| 2003/0005411 A1 | 1/2003 | Gerken |
| 2003/0061342 A1 | 3/2003 | Abdelhadi |
| 2003/0084156 A1 | 5/2003 | Graupner et al. |
| 2003/0135384 A1 | 7/2003 | Nguyen |
| 2003/0149685 A1 | 8/2003 | Trossman |
| 2003/0182656 A1 | 9/2003 | Leathers |
| 2003/0195763 A1 | 10/2003 | Gulcu |
| 2003/0208743 A1 | 11/2003 | Chong |
| 2004/0034850 A1 | 2/2004 | Burkhardt |
| 2004/0040015 A1 | 2/2004 | Jordan |
| 2004/0046785 A1 | 3/2004 | Keller |
| 2004/0078461 A1 | 4/2004 | Bendich et al. |
| 2004/0088350 A1 | 5/2004 | Early |
| 2004/0102926 A1 | 5/2004 | Adendorff |
| 2004/0148184 A1 | 7/2004 | Sadiq |
| 2004/0162901 A1 | 8/2004 | Mangipudi et al. |
| 2004/0186905 A1 | 9/2004 | Young |
| 2004/0249972 A1 | 12/2004 | White |
| 2005/0005200 A1 | 1/2005 | Matena et al. |
| 2005/0010504 A1 | 1/2005 | Gebhard et al. |
| 2005/0011214 A1 | 1/2005 | Ratliff |
| 2005/0055692 A1 | 3/2005 | Lupini et al. |
| 2005/0071737 A1 | 3/2005 | Adendorff |
| 2005/0074003 A1 | 4/2005 | Ball |
| 2005/0091227 A1* | 4/2005 | McCollum et al. ............ 707/100 |
| 2005/0120106 A1 | 6/2005 | Albertao |
| 2005/0125212 A1 | 6/2005 | Hunt et al. |
| 2005/0132041 A1 | 6/2005 | Kundu |
| 2005/0137839 A1 | 6/2005 | Mansurov |
| 2005/0149940 A1 | 7/2005 | Calinescu |
| 2005/0155042 A1 | 7/2005 | Kolb et al. |
| 2005/0165906 A1 | 7/2005 | Deo et al. |
| 2005/0182750 A1 | 8/2005 | Krishna et al. |
| 2005/0188075 A1 | 8/2005 | Dias et al. |
| 2005/0216831 A1 | 9/2005 | Guzik |
| 2005/0228855 A1 | 10/2005 | Kawato |
| 2005/0246656 A1 | 11/2005 | Vasilev |
| 2005/0251546 A1 | 11/2005 | Pichetti et al. |
| 2005/0261875 A1 | 11/2005 | Shrivastava |
| 2005/0268307 A1 | 12/2005 | Gates et al. |
| 2005/0278702 A1 | 12/2005 | Koyfman |
| 2005/0283518 A1 | 12/2005 | Sargent |
| 2006/0010142 A1 | 1/2006 | Kim |
| 2006/0010164 A1 | 1/2006 | Netz |
| 2006/0013252 A1 | 1/2006 | Smith |
| 2006/0036743 A1 | 2/2006 | Deng et al. |
| 2006/0064460 A1 | 3/2006 | Sugawara |
| 2006/0070066 A1 | 3/2006 | Grobman |
| 2006/0070086 A1 | 3/2006 | Wang |
| 2006/0074730 A1 | 4/2006 | Shukla et al. |
| 2006/0074734 A1 | 4/2006 | Shukla et al. |
| 2006/0080352 A1 | 4/2006 | Boubez |
| 2006/0095443 A1 | 5/2006 | Kumar |
| 2006/0101059 A1 | 5/2006 | Mizote |
| 2006/0123389 A1 | 6/2006 | Kolawa et al. |
| 2006/0123412 A1* | 6/2006 | Hunt et al. .................... 717/174 |
| 2006/0155738 A1 | 7/2006 | Baldwin |
| 2006/0161862 A1 | 7/2006 | Racovolis et al. |
| 2006/0173906 A1 | 8/2006 | Chu et al. |
| 2006/0206537 A1 | 9/2006 | Chiang |
| 2006/0206890 A1 | 9/2006 | Shenfield et al. |
| 2006/0230314 A1 | 10/2006 | Sanjar et al. |
| 2006/0235859 A1 | 10/2006 | Hardwick et al. |
| 2006/0236254 A1 | 10/2006 | Mateescu |
| 2006/0242195 A1 | 10/2006 | Bove |
| 2006/0265231 A1 | 11/2006 | Fusaro et al. |
| 2006/0277323 A1 | 12/2006 | Joublin et al. |
| 2006/0277437 A1 | 12/2006 | Ohtsuka |
| 2006/0294502 A1 | 12/2006 | Das |
| 2006/0294506 A1 | 12/2006 | Dengler et al. |
| 2007/0005283 A1 | 1/2007 | Blouin |
| 2007/0005299 A1 | 1/2007 | Haggerty |
| 2007/0006122 A1 | 1/2007 | Bailey et al. |
| 2007/0016615 A1 | 1/2007 | Mohan et al. |
| 2007/0033088 A1 | 2/2007 | Aigner et al. |
| 2007/0038994 A1 | 2/2007 | Davis et al. |
| 2007/0050237 A1 | 3/2007 | Tien |
| 2007/0050483 A1 | 3/2007 | Bauer et al. |
| 2007/0061775 A1 | 3/2007 | Tanaka |
| 2007/0061776 A1 | 3/2007 | Ryan et al. |
| 2007/0067266 A1 | 3/2007 | Lomet |
| 2007/0089117 A1 | 4/2007 | Samson |

| | | |
|---|---|---|
| 2007/0094350 A1 | 4/2007 | Moore |
| 2007/0112847 A1 | 5/2007 | Dublish |
| 2007/0168924 A1 | 7/2007 | Kirby |
| 2007/0174228 A1 | 7/2007 | Folting |
| 2007/0174815 A1 | 7/2007 | Chrysanthakopoulos et al. |
| 2007/0179823 A1 | 8/2007 | Bhaskaran |
| 2007/0208606 A1 | 9/2007 | MacKay |
| 2007/0220177 A1 | 9/2007 | Kothari |
| 2007/0226681 A1 | 9/2007 | Thorup |
| 2007/0233879 A1 | 10/2007 | Woods |
| 2007/0244904 A1 | 10/2007 | Durski |
| 2007/0245004 A1 | 10/2007 | Chess |
| 2007/0277109 A1 | 11/2007 | Chen |
| 2007/0283344 A1 | 12/2007 | Apte et al. |
| 2007/0288885 A1 | 12/2007 | Brunel et al. |
| 2007/0294364 A1 | 12/2007 | Mohindra et al. |
| 2008/0005729 A1 | 1/2008 | Harvey |
| 2008/0010631 A1 | 1/2008 | Harvey |
| 2008/0127052 A1 | 5/2008 | Rostoker |
| 2008/0209414 A1 | 8/2008 | Stein |
| 2008/0244423 A1 | 10/2008 | Jensen-Pistorius |
| 2009/0009662 A1 | 1/2009 | Manapragada |
| 2009/0049165 A1 | 2/2009 | Long et al. |
| 2009/0187662 A1 | 7/2009 | Manapragada et al. |
| 2009/0265458 A1 | 10/2009 | Baker |
| 2010/0005527 A1 | 1/2010 | Jeon |
| 2011/0179151 A1 | 7/2011 | Sedukhin |
| 2011/0219383 A1 | 9/2011 | Bhaskar |
| 2012/0042305 A1 | 2/2012 | Sedukhin |

FOREIGN PATENT DOCUMENTS

| | | |
|---|---|---|
| EP | 1770510 | 4/2007 |
| WO | WO 00/38091 | 6/2000 |
| WO | 0124003 | 4/2001 |
| WO | WO 02/27426 A2 | 4/2002 |
| WO | 2007072501 | 6/2007 |

OTHER PUBLICATIONS

U.S. Appl. No. 11/740,737, filed Apr. 26, 2007, Sedhukin.
U.S. Appl. No. 11/771,827, filed Jun. 29, 2007, Sedhukin.
Frecon, Emmanuel, et al., "DIVE: a scaleable network architecture for distributed virtual environments", The British Computer Society, The Institution of Electrical Engineers and IOP Publishing Ltd, Mar. 6, 1998, pp. 91-100.
Baldi, Mario, et al., "Exploiting Code Mobility in Decentralized and Flexible Network Management", Lecture Notes in Computer Science, vol. 1219, Proceedings of the First International Workshop on Mobile Agents, pp. 13-26.
Milenkovic, Milan, et al., "Towards Internet Distributed Computing", Sep. 26, 2003, http://m.students.umkc.edu/mpshxf/Towards_IDC.pdf.
Dias, M. Bernardine, et al., "A Real-Time Rover Executive Based on Model-Based Reactive Planning" The 7th International Symposium on Artificial Intelligence, Robotics and Automation in Space, May 2003.
Goble, Carole, et al., "Building Large-scale, Service-Oriented Distributed Systems using Semantic Models", http://www.jisc.ac.uk/media/documents/programmes/capital/grid_standards_above_ogsa.pdf, 21 pages.
Robinson, William N. "Implementing Rule-based Monitors within a Framework for continuous Requirements Monitoring" Proceedings of the 38th Hawaii International Conference on System Sciences, 2005 IEEE, 10 pages.
Maghraoui, Kaoutar EL, et al., "Model Driven Provisionings: Bridging the Gap Between Declarative Object Models and Procedural Provisioning Tools", http://wcl.cs.rpi.edu/papers/middleware06.pdf.
U.S. Appl. No. 11/925,079, filed Oct. 26, 2007, Bhaskar.
U.S. Appl. No. 11/925,326, filed Oct. 26, 2007, Christensen.
U.S. Appl. No. 11/925,680, filed Oct. 26, 2007, Sedukhin.
U.S. Appl. No. 11/925,591, filed Oct. 26, 2007, Sedukhin.
U.S. Appl. No. 11/925,067, filed Oct. 26, 2007, Sedukhin.
U.S. Appl. No. 11/925,184, filed Oct. 26, 2007, Voss.
U.S. Appl. No. 11/925,201, filed Oct. 26, 2007, Sedukhin.
U.S. Appl. No. 60/983,117, filed Oct. 26, 2007, Skierkowski.
OSLO>Suite 2006, "OSLO Suite is the leading platform for designing, building and executing adaptive business solutions", http://www.oslo-software.com/en/product.php.
Korb, John T., et al., "Command Execution in a Heterogeneous Environment", 1986 ACM, pp. 68-74.
Von, Vorgelet, et al., "Dynamic Upgrade of Distributed Software Components", 2004, 191 pages.
Poslad, Stefan, et al., "The FIPA-OS agent platform: Open Source for Open Standards", Apr. 2000, 17 pages.
Software News, "Progress Software Extends Lead in Distributed SOA" 2007, 6 pages.
Eidson, Thomas M., "A Component-based Programming Model for Composite, Distributed Applications", Institute for Computer Applications in Science and Engineering Hampton, VA, May 2001, 1 page.
Bauer, Michael A., "Managing Distributed Applications and Systems: An Architectural Experiment", Jan. 31, 1997, 46 pages.
Tawfik, Sam, "Composite applications and the Teradata EDW", Extend the capabilities of your enterprise data warehouse with supporting applications, Teradata Magazine online, Archive: vol. 6, No. 4, Dec. 2006, 3 pages.
Alpern, Bowen, et al, "PDS: A Virtual Execution Environment for Software Deployment", 2005, pp. 175-185.
Talcott, Carolyn L., MTCoord 2005 Preliminary Version, "Coordination Models Based on a Formal Model of Distributed Object Reflection", 13 pages.
Leymann, F., et al., "Web Services and Business Process Management", IBM Systems Journal, vol. 41, No. 2, 2002, New Developments in Web Services and E-commerce, 11 pages.
Ivan, A.-A, et al., "Partionable services: A framework for seamlessly adapting distributed applications to heterogeneous environments", High Performance Distributed Computing, 2002. HPDC-11 2002. Proceedings. 11th IEEE International Symposium, 1 page.
Urban, Susan D., et al., "Active Declarative Integration Rules for Developing Distributed Multi-Tiered Applications", 3 pages.
Bischoff, Urs, et al., "Programming the Ubiquitous Network: A Top-Down Approach" System Support for Ubiquitous Computing Workshop (UbiSys'06), Orange County, USA, Sep. 2006, 8 pages.
Albrecht, Jeannie, et al., "Remote Control: Distributed Application Configuration Management, and Visualization with Plush", Proceedings of the Twenty-first USENIX Large Installation System Administration Conference (LISA), Nov. 2007, 16 pages.
U.S. Appl. No. 12/105,083, filed Apr. 17, 2008 (Not Yet Published).
"Managing Complexity in Middleware," by Adrian Colyer, Gordon Blair and Awais Rashid, IBM UK Limited, Hursley Park, Winchester, England and Computing Department, Lancaster University, Bailrigg, Lancaster, England, [online] [retrieved on Apr. 20, 2007], 6 pgs. Retrieved from the Internet: http://www.aosd.net/2005/workshops/acp4is/past/acp4is03/papers/colyer.pdf.
"User Interface Declarative Models and Development Environments: A Survey," by Paulo Pinheiro Da Silva, Department of Computer Science, University of Manchester, Manchester, England, [online] [retrieved on Apr. 20, 2007], 20 pgs. Retrieved from the Internet: http://www.cs.utep.edu/paulo/papers/PinheirodaSilva_DSVIS_2000.pdf.
"Architecturing and Configuring Distributed Application with Olan," by R. Balter, L. Bellissard, F. Boyer, M Riveill and J.Y. Vion-Dury, Middleware 98 Conference Report, Inria, France, [online] [retrieved on Apr. 20, 2007], 15 pgs. Retrieved from the Internet: http://www.comp.lancs.ac.uk/computing/middleware98/papers.html.
"A Load Balancing Module for the Apache Web Server," Author Unknown, [online] [retrieved on Apr. 20, 2007], 9 pgs. Retrieved from the Internet: http://www.backhand.org/ApacheCon2000/US/mod_backhand_coursenotes.pdf.
"Performance Tuning and Optimization of J2ee Applications on the Jboss Platform," by Samuel Kounev, Bjorn Weis and Alejandro Buchmann, Department of Computer Science, Darmstadt University of Technology, Germany, [online] [retrieved on Apr. 20, 2007], 10 pgs. Retrieved from the Internet: http://www.cl.cam.ac.uk/~sk507/pub/04-cmg-JBoss.pdf.
"Outlier Detection for Fine-Grained Load Balancing in Database Clusters," by Jin Chen, Gokul Soundararajan, Madalin Mihailescu and Cristiana Amza, Department of Computer Science, Department of Electrical and Computer Engineering, University of Toronto,

[online] [retrieved on Apr. 20, 2007], 10 pgs. Retrieved from the Internet: http://www.cs.toronto.edu/Hinchen/papers/smdb07.pdf.
Office Action dated Sep. 14, 2009 cited in U.S. Appl. No. 11/740,737.
Office Action dated Oct. 14, 2009 cited in U.S. Appl. No. 11/771,827.
"Factal:Edge Enlists CMLgroup to Bring Visualization to Business Performance Management Clients", http://extranet.fractaledge.com/News/PressReleases/2006/060829, 2006, 2 pages.
Nastel Technologies, Inc., "AutoPilot Business Dashboard Configuration and User's Guide Version 4.4", 2006, AP/DSB 440.001, 82 pages.
TIBCO the Power of Now, "TIBCO BusinessFactor", 2006, 2 pages.
TIBCO, http://wwvv.tibco.com/software/business_activity_monitoring/businessfactor/default.jsp, Copyright 2000-2007, 2 pages.
U.S. Appl. No. 11/925,184, Jan. 14, 2011, Office Action.
U.S. Appl. No. 11/740,737, Feb. 10, 2011, Office Action.
Rowe, L.A., et al., "Automating the Selection of Implementation Structures," IEEE Transactions on Software Engineering, Nov. 1978, pp. 494-506, [retrieved on Jan. 6, 2012], Retrieved from the internet: <URL:http://ieeexplore.ieee.org/>.
Oberle, D., et al., "Developing and Managing Software Components in an Ontology-Based Application Server," Proceedings of the 5th ACM/IFIP/USENIX international conference on Middleware, Oct. 2004, pp. 459-477, [retrieved on Jan. 6, 2012], Retrieved from the Internet: <URL:http://dl.acm.org/>.
Notice of Allowance dated Jan. 17, 2012 cited in U.S. Appl. No. 11/925,591.
Office Action dated Jan. 3, 2012 cited in U.S. Appl. No. 13/110,223.
Notice of Allowance dated Mar. 9, 2012 cited in U.S. Appl. No. 11/844,177.
Ketfi A., et al., "Model-Driven framework for Dynamic Deployment and Reconfiguration of Component-Based Software Systems", Metainformatics Symposium, Nov. 9-11, 2005, 9 pages, [retrived on Mar. 6, 2012], retrived from the Internet: <URL:http://dl.amc.org/>.
Eastman, J., et al., "Service Lifecycle in a Distributed Computing Environment", IEEE, 1998, pp. 183-184, [retrieved on Mar. 6, 2012], Retrieved from the Internet: <URL:http://ieeexplore.ieee.org/>.
Notice of Allowance dated Mar. 14, 2012 cited in U.S. Appl. No. 11/925,680.
Office Action dated Mar. 18, 2010 cited in U.S. Appl. No. 11/740,737.
U.S. Appl. No. 11/925,079, Mar. 1, 2011, Notice of Allowance.
Office Action dated Apr. 5, 2010 cited in U.S. Appl. No. 11/771,827.
Office Action dated Apr. 13, 2010 cited in U.S. Appl. No. 11/925,326.
U.S. Appl. No. 11/925,184, Apr. 25, 2011, Office Action.
U.S. Appl. No. 11/740,737, Apr. 29, 2011, Notice of Allowance.
Rosenblum, D., and Wolf, A. "A Design Framework for Internet-Scale Event Observation and Notification," ACM SIGSOFT Software Engineering Notes. vol. 22, Issue 6, Nov. 1997. [retrieved on Jun. 12, 2011]. Retrieved from the Internet: <URL:www.acm.org>.
D. Raymar et al.; End-to-End Model Driven Policy Based Network Management; 2006-computer.org; pp. 1-4.
R.M. Argent et al.; Development of Multi-Framework Model Components; 2004; Citeseer; pp. 1-6.
U.S. Appl. No. 11/925,680, Jul. 18, 2011, Office Action.
U.S. Appl. No. 11/925,591, Jul. 5, 2011, Office Action.
U.S. Appl. No. 13/077,730, Jul. 14, 2011, Office Action.
U.S. Appl. No. 11/925,201, Jul. 19, 2011, Notice of Allowance.
U.S. Appl. No. 11/925,326, Jul. 22, 2010, Notice of Allowance.
Quentin Limbourg et al: "USIXML: A Language Supporting Multi-path Development of User Interfaces", Engineering Human Computer Interaction and interactive Systems; [Lecture Notes in Computer Science;;LNCS], Springer-Verlag, Berlin/Heidelberg, vol. 3425, Jun. 30, 2005 pp. 200-220, CP019009959 ISBN: 978-3-540-26097-4.
Pierre-Alain Muller et al., "Platform Independent Web Application Modeling and Development with Netsilon", Software & Systems Modeling, Springer, Berlin, DE, vol. 4, No. 4, Nov. 1, 2005, pp. 424-442, XP019357229, ISSN: 1619-1374.
Wang L J et al: "Abstract Interface Specification Languages for device-independent Interface Design: Classification, Analysis and Challenges", Pervasive Computing and Applications, 2006 1st International Symposium on, IEEE, PI, Aug. 1, 2006, pp. 241-246.
Jean Vanderdonckt ed—Oscar Pastor et al, "A MDA—Compliant Environment for Developing User Interfaces of information Systems", Advanced Information Systems Engineering; [Lecture Notes in Computer Science;;LNCS], Springer-Verlag, Berling, Berlin/Heidelberg, vol. 3520, May 17, 2005, pp. 16-31.
Xiaofeng Yu et al., "Towards a Model Driven Approach to Automatic BPEL Generation", Model Driven Architecture Foundations and Applications; [Lecture Notes in Computer Science;;LNCS], Springer Berlin Heidelberg, vol. 4530, Jun. 11, 2007 pp. 204-218.
U.S. Appl. No. 11/925,079, Sep. 1, 2010, Office Action.
U.S. Appl. No. 11/740,737, Sep. 13, 2010, Office Action.
Wikipedia, "Declarative Programming", available at wikipedia.org/w/index.php?title=Declarative_Programming&oldid=1645216, Last accessed Jul. 28, 2011, (3 pages).
Notice of Allowance dated Sep. 30, 2011 cited in U.S. Appl. No. 11/925,201.
Notice of Allowance dated Sep. 29, 2011 cited in U.S. Appl. No. 13/077,730.
Office Action dated Oct. 19, 2011 cited in U.S. Appl. No. 11/925,680.
Shaojie Wang, Synthesizing Operating System Based Device Drivers in Embedded Systems, 2003.
U.S. Appl. No. 11/771,827, Nov. 29, 2010, Notice of Allowance.
U.S. Appl. No. 11/925,067, Dec. 6, 2010, Notice of Allowance.

* cited by examiner

PROGRESSIVELY IMPLEMENTING DECLARATIVE MODELS IN DISTRIBUTED SYSTEMS

CROSS-REFERENCE TO RELATED APPLICATIONS

N/A

BACKGROUND

Background and Relevant Art

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs. In general, distributed application programs comprise components that are executed over several different hardware components, often on different computer systems in a tiered environment.

With distributed application programs, the different computer systems may communicate various processing results to each other over a network. Along these lines, an organization will employ a distributed application server to manage several different distributed application programs over many different computer systems. For example, a user might employ one distributed application server to manage the operations of an ecommerce application program that is executed on one set of different computer systems. The user might also use the distributed application server to manage execution of customer management application programs on the same or even a different set of computer systems.

Of course, each corresponding distributed application managed through the distributed application server can, in turn, have several different modules and components that are executed on still other different computer systems. One can appreciate, therefore, that while this ability to combine processing power through several different computer systems can be an advantage, there are other disadvantages to such a wide distribution of application program modules. For example, organizations typically expect a distributed application server to run distributed applications optimally on the available resources, and take into account changing demand patterns and resource availability.

Unfortunately, conventional distributed application servers are typically ill-equipped (or not equipped at all) to automatically handle and manage all of the different problems that can occur for each given module of a distributed application program. For example, a user may have an online store application program that is routinely swamped with orders whenever there is a promotion, or during the same holidays each year. In some cases, the user might expect the distributed application server to analyze and anticipate these fluctuating demands on various components or modules of the given distributed application program.

In particular, the organization might expect the distributed application server to swap around various resources so that high-demand processes can be handled by software and hardware components on other systems that may be less busy. Such accommodations, however, can be difficult if not impossible to do with conventional distributed application server platforms. Specifically, most conventional distributed application server platforms are ill-equipped or otherwise unable to identify and properly manage different demand patterns between components of a distributed application program. This may be due at least partly to the complexity in managing application programs that can have many distributed components and subsystems, many of which are long-running workflows, and/or otherwise legacy or external systems.

In addition, conventional distributed application program servers are generally not configured for efficient scalability. For example, most distributed application servers are configured to manage precise instructions of the given distributed application program, such as precise reference and/or component addressing schemes. That is, there is often little or no "loose coupling" between components of an application program. Thus, when an administrator of the server desires to redeploy certain modules or components onto another server or set of computer systems, there is an enhanced potential of errors particularly where a large number of different computer systems and/or modules may be involved. This potential for errors can be realized when some of the new module or component references are not passed onward everywhere they are needed, or if they are passed onward incorrectly.

One aspect of distributed application programs that can further enhance this potential for error is the notion that the distributed application server may be managing several different distributed application programs, each of which executes on a different platform. That is, the distributed application server may need to translate different instructions for each different platform before the corresponding distributed application program may be able to accept and implement the change. Due to these and other complications, distributed application programs tend to be fairly sensitive to demand spikes.

This sensitivity to demand spikes can mean that various distributed application program modules may continue to operate at a sub-optimum level for a long period of time before the error can be detected. In some cases, the administrator for the distributed application server may not even take corrective action since attempting to do so could result in an even greater number of errors. As a result, a distributed application program module could potentially become stuck in a pattern of inefficient operation, such as continually rebooting itself, without ever getting corrected during the lifetime of the distributed application program. Accordingly, there are a number of difficulties with management of current distributed application programs and distributed application program servers that can be addressed.

BRIEF SUMMARY

Implementations of the present invention provide systems, methods, and computer program products configured to automatically implement operations of distributed application programs through a distributed application program server. In at least one implementation, for example, a distributed application program server comprises a set of implementation means and a set of analytics means. Through a platform-specific driver for each given module of a distributed application program, the implementation means deploy sets of high-level instructions, or declarative models, to create a given distributed application program module on the respective platform, while the analytics means automatically monitor and adjust the declarative models, as needed. This loose coupling through the declarative models of server components to the distributed application program and automatic monitoring and adjustment can allow the server to better manage demand, resource, or usage spikes, and/or other forms of distributed application program behavior fluctuations.

Accordingly, a method of automatically implementing one or more sets of high-level instructions in a distributed application program during execution using declarative models can involve identifying one or more modifications to corresponding one or more declarative models in a repository. The one or more declarative models include high-level instructions regarding one or more operations of a distributed application program. The method can also involve refining the one or more declarative models to include contextual information regarding operations of the distributed application program. In addition, the method can involve translating the one or more refined declarative models into one or more commands to be implemented by the container of the distributed application program. Furthermore, the method can involve sending the translated commands to one or more application containers. The translated commands are then received by the container and used to determine and configure behavior of the distributed application program in that container.

In addition, an additional or alternative method of automatically implementing one or more sets of high-level instructions in a distributed application program during execution using declarative models can involve receiving a set of new one or more declarative models from a repository. The new one or more declarative models include high-level instructions regarding operations of a distributed application program. The method can also involve implementing the new one or more new declarative models through an implementation means and one or more application containers. As a result, a first set of low-level commands are prepared and sent to the one or more application containers to be executed.

In addition, the method can involve identifying a change in the new one or more declarative models via one or more analytics means. The change reflects performance information for the distributed application program that is received from the one or more application containers. Furthermore, the method can involve implementing an updated version of the one or more declarative models through the implementation means and the one or more application containers. As such, a second set of low-level commands are prepared and sent to the one or more application containers to be executed based on the changes to the one or more new declarative models.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to automatically implement operations of distributed application programs through a distributed application program server. In at least one implementation, for example, a distributed application program server comprises a set of implementation means and a set of analytics means. Through a platform-specific driver for each given module of a distributed application program, the implementation means deploy sets of high-level instructions, or declarative models, to create a given distributed application program module on the respective platform, while the analytics means automatically monitor and adjust the declarative models, as needed. This loose coupling through the declarative models of server components to the distributed application program and automatic monitoring and adjustment can allow the server to better manage demand, resource, or usage spikes, and/or other forms of distributed application program behavior fluctuations.

Accordingly, one will appreciate from the following specification and claims that implementations of the present invention can provide a number of different advantages to managing distributed application programs. This is at least partly due to the ease of implementing high-level instructions, such as those created by a program developer, as low-level instructions (e.g., executable commands) that can be executed by distributed application containers that configure and manage distributed application modules on a platform-specific basis. For example, implementations of the present invention provide mechanisms for writing a declarative model, detecting changes to a declarative model, and scheduling an appropriate model refinement process so that refined declarative model instructions can be translated.

Further implementations provide mechanisms for translating the refined model into instructions/commands that are ultimately executed. Accordingly, one will appreciate that these and other features can significantly ease and normalize management of a distributed application program server managing one or multiple different distributed application programs, potentially on several different platforms. In particular, the server administrator can easily configure a wide range of distributed application operations without necessarily needing to understand all the configuration particulars of the given run-time environments, and/or the specific implementation platforms of the given distributed application program.

Figure 1A:
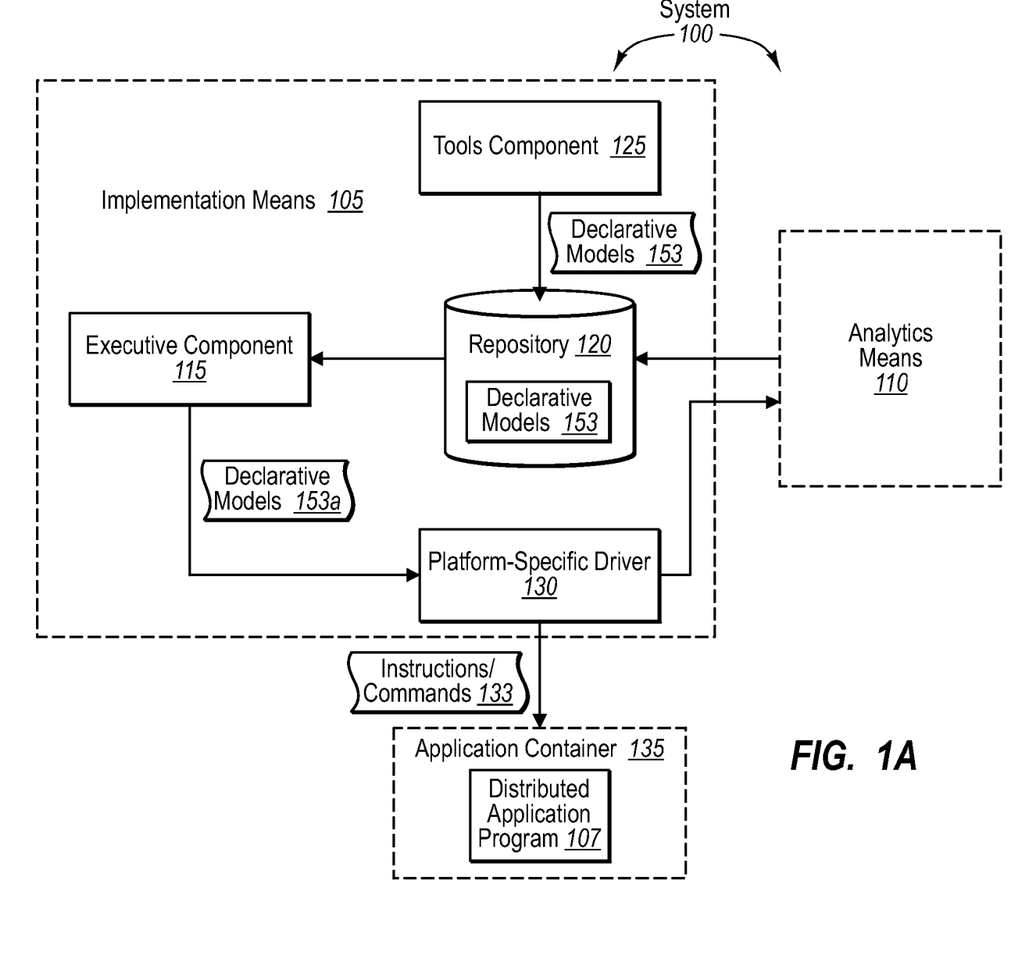
FIG. 1A illustrates an overview schematic diagram in accordance with an implementation of the present invention of a system configured to automatically implement distributed application program operations using one or more declarative models.

Referring now to the Figures, FIG. 1A illustrates an overview schematic diagram of at least one implementation of the present invention in which a distributed application server in a distributed computerized environment/system 100 is used to implement high-level instructions in one or more different distributed application programs 107 on an ongoing, automatic basis. In particular, FIG. 1A shows a system distributed system 100 comprising an implementation means 105 and an analytics means 110. In general, implementation means 105 and analytics means 110 comprise one or more sets of generalized computer-executable components that can be used within one or more distributed application program servers. These generalized computer-executable components, in turn, are configured to manage one or more different distributed application programs 107 in one or more application containers 135.

For example, FIG. 1A shows that, in at least one implementation, implementation means 105 can comprise a tools component 125. In general, tools component 125 comprises one or more sets of computer-executable programs that can be used by a program developer or a server administrator to create one or more declarative models 153. For example, a user (e.g., distributed application program developer) can use one or more developer's tools (e.g., 125), to create a declarative model 153. As a preliminary matter, one will appreciate that any reference herein to any platform (or otherwise operating system)-specific component or module/program is made purely by way of convenience in explanation. Specifically, any reference herein to any component, module or application-specific feature will be understood as capable of being applied in a wide range of operating environments, systems, and/or platforms.

In any event, and as previously mentioned, declarative models 153 include one or more sets of high-level instructions regarding operations of a particular distributed application program 107. These high-level instructions generally describe a particular intent for operation/behavior of one or more modules in the distributed application program, but do not necessarily describe steps required to implement the particular operations/behaviors. For example, a declarative model 153 can include such information as on what computer systems a particular module should run, as well as the characteristics of a computer system that should be allowed to run the particular module (e.g., processing speed, storage capacity, etc.).

Although the declarative model 153 could ultimately include such specific information as the Uniform Resource Identifier (URI) address of a particular endpoint, the initial creation of any declarative model (e.g., 153) will usually result in a document which will more likely include generalized information. Such generalized information might include a domain name where a module can be executed, different permissions sets that can be associated with execution of the module, whether or not certain components should connect at all, etc. For example, a declarative model 153 may describe the intent of having one web service connect to another web service.

When ultimately interpreted and/or translated, these generalized intent instructions can result in very specific instructions/commands, depending on the platform or operating environment. For example, the declarative model 153 could include instructions so that, when interpreted, a web service deployed into one datacenter may be configured to use a TCP transport if one other web service is nearby. The instructions could also include instructions that tell the deployed web service to alternatively use an Internet relay connection if the other web service is outside of the firewall (i.e., not nearby).

Although indicating a preference for connection of some sort, the declarative model (e.g., a "declarative application model") (153) will typically leave the choice of connection protocol to a model interpreter. In particular, a declarative model creator (e.g., tools component 125) might indicate a preference for connections in the declarative model 153 generally, while the declarative model interpreter (e.g., executive component 115 and/or platform-specific driver 130) can be configured to select different communication transports depending on where specific modules are deployed. For example, the model interpreter (e.g., executive component 115 and/or platform-specific driver 130) may prepare more specific instructions to differentiate the connection between modules when on the same machine, in a cluster, or connected over the Internet.

Similarly, another declarative model (e.g., a "declarative policy model") (153) may describe operational features based more on end use policies. For example, a declarative policy model used with a distributed financial application program may dictate that no more than 100 trade requests in a second may be sent over a connection to a brokerage firm. A policy model interpreter (e.g., executive component 115 and/or platform-specific driver 130), however, can be configured to choose an appropriate strategy, such as queuing excessive requests to implement the described intent.

In any case, FIG. 1A shows that, upon creating a particular declarative model 153, the tools component 125 then passes (e.g., writes) the declarative model 153 into repository 120. In at least one implementation, anytime repository 120 receives any kind of modification to a declarative model 153 (e.g., new writes, or modifications from analytics means 110), executive component 115 will detect this. For example, the repository 120 can send one or more updates or alerts to the executive component 115. In additional or alternative implementations, however, executive component 115 may be configured to identify any such modifications, creations, or changes by synchronizing with repository 120 on some particular schedule, or even a continuous basis.

In either case, executive component 115 ultimately identifies, receives and refines the declarative models 153 (and/or changes thereto) in repository 120 so that they can be translated by the platform-specific driver 130. In general, "refining" a declarative model 153 includes adding or modifying any of the information contained in a declarative model so that the declarative model instructions are sufficiently complete for translation by platform-specific driver 130. Since the declarative models 153 can be written relatively loosely by a human user (i.e., containing generalized intent instructions or requests), there may be different degrees or extents to which an executive component will need to modify or supplement a declarative model.

Figure 1B:
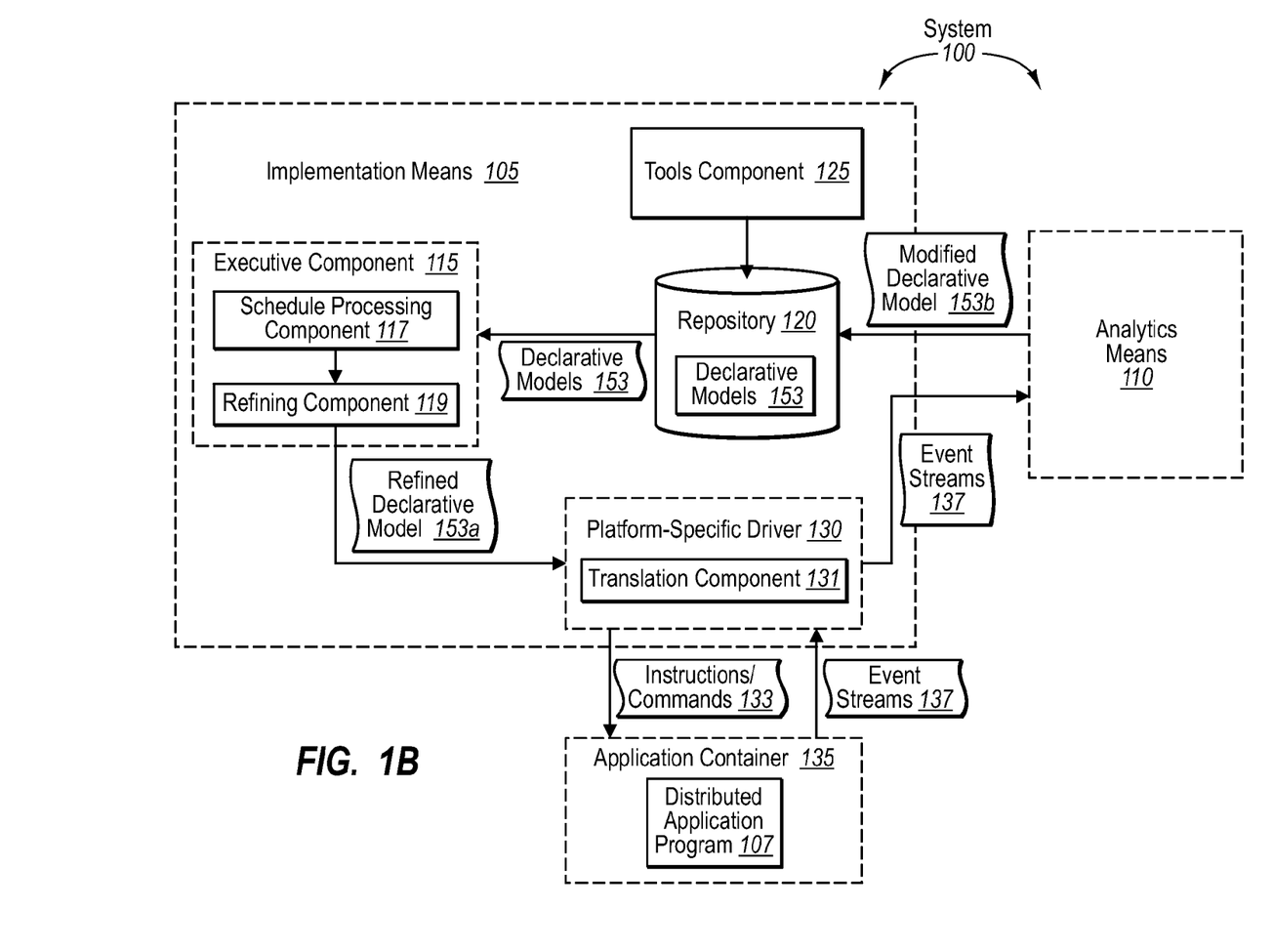
FIG. 1B illustrates a more detailed schematic diagram of the executive component and platform-specific driver shown in FIG. 1A.

Along these lines, FIG. 1B illustrates additional details regarding the refinement and translation process as performed via implementation means 105. In particular, FIG. 1B illustrates a number of additional processes that can occur pursuant to implementing the various declarative models 153 ultimately as low-level instructions. To this end, FIG. 1B shows that executive component 115 comprises one or more different components that can be used to refine declarative model 153 using a progressive elaboration techniques.

For example, FIG. 1A shows that executive component 115 comprises a schedule processing component 117 and a refining component 119. In general, the schedule processing component 117 is that which enables the executive component 115 to identify changes in the repository to any declarative models. For example, the schedule processing component 117 can comprise one or more interfaces for receiving communication from a corresponding interface built into repository 120. Additionally, or alternatively, schedule processing component 117 comprises one or more sets of executable instructions for synchronizing declarative model 153 data within the repository.

Upon detecting any changes (whether new declarative models or updates thereto), executive component 115 then begins the process of progressive elaboration on any such identified declarative model (or modification). In general, progressive elaboration involves refining a particular declarative model 153 (i.e., adding or modifying data) until there are no ambiguities, and until details are sufficient for the platform-specific drivers 130 to consume/translate them. The executive component 115 performs progressive elaboration at least in part using refining component 119, which "refines" the declarative model 153 data.

In at least one implementation, executive component 115 implements this progressive elaboration or "refining" process as a workflow that uses a set of activities from a particular library (not shown). In one implementation, the executive component 115 also provides the library in advance, and specifically for the purposes of working on declarative models. Some example activities that might be used in this particular workflow can include "read model data," "write model data," "find driver," "call driver," or the like. The actions associated with these or other types of calls are described more fully below as implemented by the refining component 119 portion of executive component 115.

Specifically, in at least one implementation, the refining component 119 refines a declarative model 153 (or update thereto). The refining component 119 typically refines a declarative model 153 by adding information based on knowledge of dependencies (and corresponding semantics) between elements in the declarative model 153 (e.g. one web service connected to another). The refining component 119 can also refine the declarative model 153 by adding some forms of contextual awareness, such as by adding information about the available inventory of application containers 135 for deploying a distributed application program 107. In addition, the refining component 119 can be configured to fill-in missing data regarding computer system assignments.

For example, refining component 119 might identify a number of different modules that will be used to implement a declarative model 153, where the two modules have no requirement for specific computer system addresses or operating requirements. The refining component 119 might thus assign the distributed application program 107 modules to available computer systems arranged by appropriate distributed application program containers 135, and correspondingly record that machine information in the refined declarative model 153*a* (or segment thereof). Along these lines, the refining component 119 can reason about the best way to fill-in data in a refined declarative model 153. For example, as previously described, refining component 119 of executive component 115 may determine and decide which transport to use for an endpoint based on proximity of connection, or determine and decide how to allocate distributed application program modules based on factors appropriate for handling expected spikes in demand.

In additional or alternative implementations, the refining component 119 can compute dependent data in the declarative model 153. For example, the refining component 119 may compute dependent data based on an assignment of distributed application program modules to machines. Along these lines, the refining component 119 may also calculate URI addresses on the endpoints, and propagate the corresponding URI addresses from provider endpoints to consumer endpoints. In addition, the refining component 119 may evaluate constraints in the declarative model 153. For example, the refining component 119 can be configured to check to see if two distributed application program modules can actually be assigned to the same machine, and if not, the refining component 119 can refine the declarative model 153*a* to correct it.

After adding all appropriate data to (or otherwise modifying/refining) the given declarative model 153 (to create model 153*a*), the refining component 119 can finalize the refined declarative model 153*a* so that it can be translated by platform-specific drivers 130. To finalize or complete the refined declarative model 153*a*, refining component 119 might, for example, partition declarative model 153 into segments that can be targeted by any one or more platform-specific drivers 130. To this end, the refining component 119 might tag each declarative model 153*a* (or segment thereof) with its target driver (e.g., the address of platform-specific driver 130). Furthermore, the refining component 119 can verify that the declarative model 153*a* can actually be translated by the platform-specific drivers 130, and, if so, pass the refined declarative model 153*a* (or segment thereof) to the particular platform-specific driver 130 for translation.

In any case, FIG. 1B shows that the platform-specific driver 130 translates these instructions through translation component 131. In general, translation component translates the refined declarative models 153*a* (and/or segment thereof) into sets of one or more platform-specific instructions/commands 133. For example, FIG. 1B shows that the platform-specific driver 130 might create a set of imperative instructions/commands 133 that can be executed in a particular operating system or operating environment, and/or will be understood by a specific application container 135. In one implementation, translation of a refined declarative model 153*a* can result in the creation of files, adding virtual directories, writing settings into configuration files, or the like.

Whatever actions performed by the translation component 131 will be tailored for the specific platform or operating environment. In particular, the platform-specific driver (e.g., via translation component 131) can translate the refined declarative models according to in-depth, platform-specific configuration knowledge of a given platform/operating environment corresponding to the one or more application containers 135 (e.g., version of the operating system they run under) and container implementation technologies. With respect to a MICROSOFT WINDOWS operating environment, for example, some container implementation technologies might include "IIS"—Internet Information Service, or a WINDOWS ACTIVATION SERVICE used to host a "WCF"—WINDOWS Communication Foundation—service module). (As previously mentioned, however, any specific reference to any WINDOWS or MICROSOFT components, modules, platforms, or programs is by way only of example.)

As a result, the generalized or supplemented instructions placed into the declarative models by the tools component 125 and/or refining component 119 ultimately direct operational reality of one or more distributed application programs 107 in one or more application containers 135. In particular, the one or more distributed application containers 135 execute the declarative models 153 by executing the instructions/commands 133 received from the platform-specific driver 130. To this end, the distributed application containers 135 might replace or update any prior modules have been replaced or revised with a new declarative model 153. In addition, the distributed application containers 135 execute the most recent version of modules and/or components, such as normally done, including those described in the new instructions/commands 133, and on any number of different computer systems.

In addition to the foregoing, the distributed application programs 107 can provide various operational information about execution and performance back through the implementation means 105. For example, implementations of the present invention provide for the distributed application program 107 to send back one or more event streams 137 regarding various execution or performance indicators back through platform-specific driver 130. In one implementation, the distributed application program 107 may send out the event streams 137 on a continuous, ongoing basis, while, in other implementations, the distributed application program 107 sends the event streams on a scheduled basis (e.g., based on a scheduled request from driver 130). The platform-specific drivers 130, in turn, pass the one or more event streams 137 to analytics means 110 for analysis, tuning, and/or other appropriate modifications.

In particular, and as will be understood more fully herein, the analytics means 110 aggregate, correlate, and otherwise filter the relevant data to identify interesting trends and behaviors of the various distributed application programs 107. The analytics means 110 can also modify corresponding declarative models 153 as appropriate for the identified trends. For example, the analytics means 110 may modify declarative models 153 to create a new or otherwise modified declarative model 153b that reflects a change in intent, such as to overcome a problem identified in event streams 137. In particular, the modified declarative model 153b might be configured so that a given module of a distributed application program can be redeployed on another machine if the currently assigned machine is rebooting too frequently.

The modified declarative model 153b is then passed back into repository 120. As previously mentioned, executive component 115 will identify the new declarative model 153b (or modification to a prior declarative model 153) and begin the corresponding refining process. Specifically, executive component will use refining component 119 to add any necessary data to modified declarative model 153b to create refined, modified declarative model, such as previously described. The newly refined, albeit modified declarative model 153b is then passed to platform-specific driver 130, where it is translated and passed to the appropriate application containers 135 for processing.

Accordingly, FIGS. 1A-1B (and the corresponding text) provide a number of different schematics, components, and mechanisms for automatically implementing high-level instructions within distributed application programs. As previously described, this can all be done without necessarily requiring intimate knowledge by a server administrator of the distributed application programs and their containers.

Figure 2:
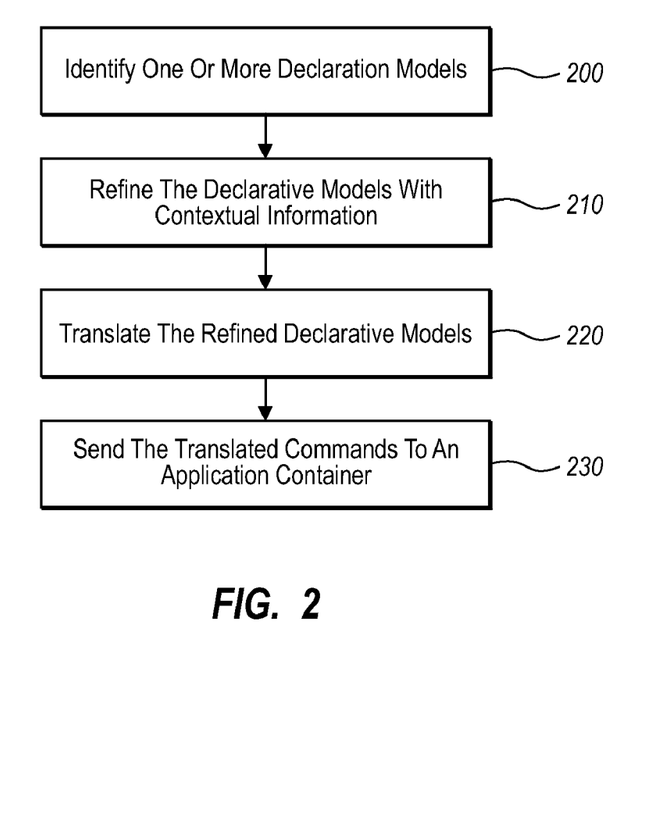
FIG. 2 illustrates a flowchart in accordance with an implementation of the present invention of a series of acts in a method of implementing one or more sets of high-level instructions in a distributed application program during execution thereof using declarative models.
Figure 3:
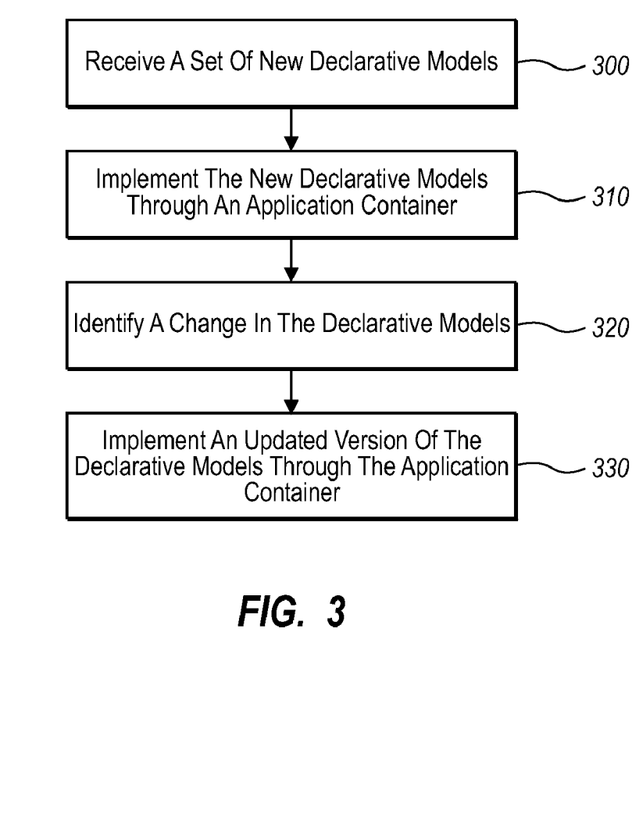
FIG. 3 illustrates an additional flowchart of an additional or alternative method in accordance with an implementation of the present invention for implementing one or more sets of high-level instructions in a distributed application program during execution thereof using declarative models.

In addition to the foregoing, implementations of the present invention can also be described in terms of one or more flow charts of methods having a series of acts and/or steps for accomplishing a particular result. For example, FIGS. 2 and 3 illustrate additional or alternative methods from the perspective of a server for automatically implementing one or more sets of high-level instructions in a distributed application program. The acts and/or steps of FIGS. 2 and 3 are described more fully below with respect to the components, schematics, and corresponding text of FIGS. 1A and 1B.

For example, FIG. 2 shows that a method from the perspective of a server of automatically implementing one or more sets of high-level instructions in a distributed application program during execution can comprise an act 200 of identifying one or more declarative models. Act 200 includes identifying one or more modifications to corresponding one or more declarative models into a repository, the one or more declarative models including high-level instructions regarding one or more operations of a distributed application program. For example, as shown in FIGS. 1A and 1B, tools component 125 can be used to create and/or pass declarative models 153 into repository 120. Executive component 115 (e.g., via schedule processing component 117) receives the declarative models 153 (or corresponding updates thereto) and begins processing.

FIG. 2 also shows a method from the perspective of the server can comprise an act 210 of refining the declarative models with contextual information. Act 210 includes, refining the identified one or more declarative models to include contextual information regarding operations of the distributed application program. For example, executive component 115 can perform any number of actions, such as filling in missing data in a declarative model, deciding which transport to use in connection between modules, computing dependent data in a declarative model, evaluating constraints in a declarative model, and so forth.

In addition, FIG. 2 shows that the method from the perspective of the server can comprise an act 220 of translating the refined declarative models. Act 220 includes translating the one or more refined declarative models into one or more commands to be implemented by the distributed application program. For example, implementation means 105 in FIGS. 1A and 1B includes a platform-specific driver component 130 that receives instructions corresponding to refined declarative model 153a and translates that refined declarative model 153a through translation component 131 to send a set of instructions/commands 133 to one or more application containers 135.

Furthermore, FIG. 2 shows that the method from the perspective of the server can comprise an act 230 of sending the translated commands to an application container. Act 230 includes, sending the translated commands to one or more application containers, wherein the translated commands are received and implemented. For example, as show in FIGS. 1A and 1B, upon translating the instructions to create platform-specific instructions/commands 133, platform-specific driver 130 prepares (e.g., via translation component 131) and sends these commands to the one or more application containers 135, whereupon they are executed in order to configure and manage distributed application programs.

In addition to the foregoing, FIG. 3 shows that an additional or alternative method from the perspective of the server of automatically implementing one or more sets of high-level instructions can comprise an act 300 of receiving a set of new declarative models. Act 300 includes receiving a set of new one or more declarative models from a repository, the new one or more declarative models including high-level instructions regarding operations of a distributed application program. For example, executive component 115 receives declarative models 113 through repository 120. These declarative models 113 can come from tools component 125 if they are new or may alternatively come via analytics means 110, such as if they are modified in response to information in event streams 137.

FIG. 3 also shows the method from the perspective of the server can comprise an act 310 of implementing the new declarative models through an application container. Act 310 includes implementing the new one or more declarative models through an implementation means in one or more application containers, wherein a first set of low-level commands are prepared and sent to one or more application containers to be executed. For example, FIGS. 1A and 1B show that the executive component 115, such as via scheduling processing component 117, and refining component 119, prepares a set of refined declarative model 153a information. A platform-specific driver 130 then translates the information into specific sets of instructions/commands 133. These specific sets of instructions/commands 133 then configure and control behavior of the distributed application program(s) 107 through the execution in the respective application containers 135.

In addition, FIG. 3 shows a method from the perspective of the server can comprise an act 320 of identifying a change in the declarative models. Act 320 includes identifying a change in the new one or more declarative models via one or more analytics means, the change reflecting performance information for the distributed application program that is received from the one or more application containers. For example, FIG. 1B shows that application container 135 sends performance information 140 back through platform-specific driver 130 of the implementation means 105. This information is then passed on to the analytics means 110, which, if appropriate, can change or update the declarative models 113 to accommodate any performance issues. As previously discussed, the event streams might identify that a server (or module on a server) is rebooting too frequently, and so analytics means might create a modification to the declarative model (or 153b) that identifies an intent to redeploy the module onto another server.

Furthermore, FIG. 3 shows that a method from the perspective of the server can comprise an act 330 of implementing an updated version of the declarative models through the application container. Act 330 includes implementing an updated version of the one or more declarative models through the implementation means and the one or more application containers, wherein a second set of low-level commands are prepared and sent to the one or more application containers to be executed based on the changes to the one or more new declarative models. For example, FIG. 1B shows that implementation means 105 can receive a modified declarative model 153b. As with model 153, declarative model 153b can then be detected and refined through executive component 115, which then passes the refined, modified declarative model 153b instructions to platform-specific driver 130 for translation. As before, the distributed application container(s) 135 then execute the new corresponding instructions/commands corresponding to refined, modified declarative model 153b to reconfigure the distributed application programs in their respective application containers.

Accordingly, FIGS. 1A through 3 provide a number of schematics, components, and mechanisms for automatically implementing high-level instructions at the server level that are ultimately implemented as low-level instructions through an application container. As described herein, these and other advantages can enable a server administrator to continually and automatically adjust distributed application program operations without necessarily requiring intimate knowledge of the platform requirements and rules of a particular distributed application program. As such, implementations of the present invention are highly scalable across distributed systems, and relatively simple to manage.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a server having one or more implementations means and one or more analytics means configured in a distributed computerized system environment to manage one or more distributed application programs through one or more platform-specific drivers, a method performed by a processor of the server of automatically implementing one or more sets of high-level instructions in a distributed application program during execution thereof using declarative models, comprising the acts of:

storing, by the processor, one or more declarative models in a repository, the one or more declarative models including high-level instructions regarding one or more operations of a distributed application program;

refining the one or more declarative models to include contextual information regarding operations of the distributed application program;

translating the one or more refined declarative models into sets of one or more platform-specific commands to be implemented by one or more application containers;

sending the translated commands to the one or more application containers, wherein the translated commands are received and executed by the one or more application containers to configure and control the distributed application program;

while the distributed application program is executing, receiving one or more modifications to the one or more declarative models in the repository; and in response to the one or more modifications, refining and translating the one or more modified declarative models into sets of one or more platform-specific commands, and sending the sets of one or more platform-specific commands to the one or more application containers to be executed by the one or more application containers to implement the distributed application program such that the one or more modifications to the one or more declarative models are reflected in the distributed application program.

2. The method as recited in claim 1, wherein the one or more declarative models describe one or more distributed application program operational intents, and do not include specific information for implementing the distributed application program operational intents.

3. The method as recited in claim 1, further comprising, upon identifying the one or more modifications, an executive component scheduling a refinement process that adds information to a corresponding modified form of the one or more declarative models.

4. The method as recited in claim 1, wherein refining the one or more declarative models further comprises an executive component adding information regarding dependencies between elements in any of the one or more declarative models and inventory of the one or more application containers.

5. The method as recited in claim 1, wherein refining the one or more declarative models further comprises adding any missing data in the one or more declarative models that is required for translation by a platform-specific driver.

6. The method as recited in claim 5, wherein adding any missing data includes identifying specific computer systems on which one or more modules of the distributed application program should run.

7. The method as recited in claim 5, wherein adding any missing data includes determining one or more transport protocols to use between connected modules used by the distributed application program.

8. The method as recited in claim 5, wherein adding any missing data includes identifying any dependent data within at least one of the one or more declarative models.

9. The method as recited in claim 8, further comprising the acts of:

identifying one or more URI addresses for the identified dependent data; and propagating any additional URI addresses between the identified dependent data.

10. The method as recited in claim 5, wherein adding any missing data further comprises identifying any constraints in the one or more declarative models regarding location of one or more distributed application program modules on a particular computer system.

11. The method as recited in claim 5, wherein adding any missing data further comprises completing the one or more declarative models so that they can be translated by a platform-specific driver.

12. The method as recited in claim 11, wherein completing the one or more declarative models to be translated further comprises including an address of a platform-specific driver in each of the refined, completed one or more declarative models.

13. The method as recited in claim 12, further comprising the executive component verifying the one or more declarative models with each platform-specific driver to determine that each of the one or more declarative models can be translated.

14. At a server having one or more implementations means and one or more analytics means configured in a distributed computerized system environment to manage one or more distributed application programs through one or more platform-specific drivers, a method performed by a processor of the server of automatically implementing one or more sets of high-level instructions in a distributed application program during execution thereof in one or more distributed application containers using declarative models, comprising the acts of:

receiving a set of new one or more declarative models from a repository, the new one or more declarative models including high-level instructions regarding operations of a distributed application program;

implementing the distributed application program through an implementation means and one or more application containers by generating a first set of low-level platform-specific commands from the new one or more declarative models and sending the first set of low-level platform-specific commands to the one or more application containers to be executed;

modifying the new one or more declarative models in the repository to address performance information of the distributed application program that is received from the one or more application containers while the distributed application program is executing;

identifying the modification to the new one or more declarative models in the repository via one or more analytics means; and implementing an updated version of the distributed application program through the implementation means and the one or more application containers by generating a second set of low-level platform-specific commands from the modified new one or more declarative models and sending the second set of low-level platform-specific commands to the one or more application containers to be executed.

15. The method as recited in claim 14, wherein implementing the new one or more declarative models further comprises:

preparing a refined set of one or more new instructions corresponding to the new one or more declarative models; and verifying that the set of one or more new instructions can be translated by a platform-specific driver into the first set of low-level commands.

16. The method as recited in claim 14, wherein implementing the updated version of the distributed application program further comprises:

preparing a new refined set of one or more updated instructions corresponding to the modified new one or more declarative models; and verifying that the new refined set of one or more updated instructions can be translated by a platform-specific driver into the second set of low-level commands.

17. The method as recited in claim 14, wherein the performance information is received from the one or more application containers in one or more event streams.

18. The method as recited in claim 17, wherein the one or more event streams are received via a platform-specific driver that interfaces with the one or more application containers.

19. At a server having one or more implementations means and one or more analytics means configured in a distributed computerized system environment to manage one or more distributed application programs through one or more platform-specific drivers, a computer program storage product comprising computer executable instructions stored thereon that, when executed, cause one or more processors at the server to perform a method comprising the acts of:

storing, by the processor, one or more declarative models in a repository, the one or more declarative models including high-level instructions regarding one or more operations of a distributed application program;

refining the one or more declarative models to include contextual information regarding operations of the distributed application program;

translating the one or more refined declarative models into sets of one or more platform -specific commands to be implemented by one or more application containers;

sending the translated commands to the one or more application containers, wherein the translated commands are received and executed by the one or more application containers to configure and control the distributed application program;

while the distributed application program is executing, receiving one or more modifications to the one or more declarative models in the repository; and in response to the one or more modifications, refining and translating the one or more modified declarative models into sets of one or more platform-specific commands, and sending the sets of one or more platform-specific commands to the one or more application containers to be executed by the one or more application containers to implement the distributed application program such that the one or more modifications to the one or more declarative models are reflected in the distributed application program.

* * * * *